United States Patent
Yoshida

(10) Patent No.: US 7,095,521 B2
(45) Date of Patent: Aug. 22, 2006

(54) INFORMATION PROCESSING METHOD AND APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 995 days.

(21) Appl. No.: 10/043,125

(22) Filed: Jan. 14, 2002

(65) Prior Publication Data

US 2002/0093689 A1    Jul. 18, 2002

(30) Foreign Application Priority Data

Jan. 18, 2001    (JP) .............................. 2001-010174

(51) Int. Cl.
*H04N 1/00* (2006.01)

(52) U.S. Cl. .................... 358/1.15; 358/400; 358/440; 358/407

(58) Field of Classification Search ............... 358/1.15, 358/400, 440, 500, 407, 529, 501, 505
See application file for complete search history.

(56) References Cited

U.S. PATENT DOCUMENTS 5,084,770 A * 1/1992 Nakayama .................. 358/403
5,668,642 A   9/1997 Yoshida ...................... 358/437
6,426,809 B1 * 7/2002 Hayashi et al. ............. 358/529
6,894,799 B1 * 5/2005 Kuwahara et al. ......... 358/1.15

OTHER PUBLICATIONS

U.S. Appl. No. 09/571,152, filed May 16, 2000, by Suga, D., et al.
U.S. Appl. No. 09/954,069, filed Sep. 18, 2001, by Yoshida, T.

* cited by examiner

*Primary Examiner*—Kimberly Williams
*Assistant Examiner*—Charlotte M. Baker
(74) *Attorney, Agent, or Firm*—Fitzpatrick, Cella, Harper & Scinto

(57) ABSTRACT

In a color facsimile apparatus, a plurality of image data are grouped for each destination, and the groups are further sub-grouped on the basis of data types such as color and monochrome images. In addition, these groups may be sub-grouped on the basis of encoding types such as MR encoding and JBIG encoding. Each sub-group created in this manner includes a plurality of image data having the same destination and data type. Image data are transmitted on a sub-group basis. That is, a plurality of image data can be transmitted by originating a single call. Since only image data of the same type are transmitted with a single call, confusion on the receiving side can be prevented.

46 Claims, 10 Drawing Sheets

FIG. 2

| ONE-TOUCH DIAL | DESTINATION | BATCH TRANSMISSION |
|---|---|---|
| 01 | 03-1234-0XXX | YES |
| 02 | 06-5678-3XXX | NO |
| .... | .... | .... |
| 100 | 045-678-9XXX | YES |

18a

F I G. 10
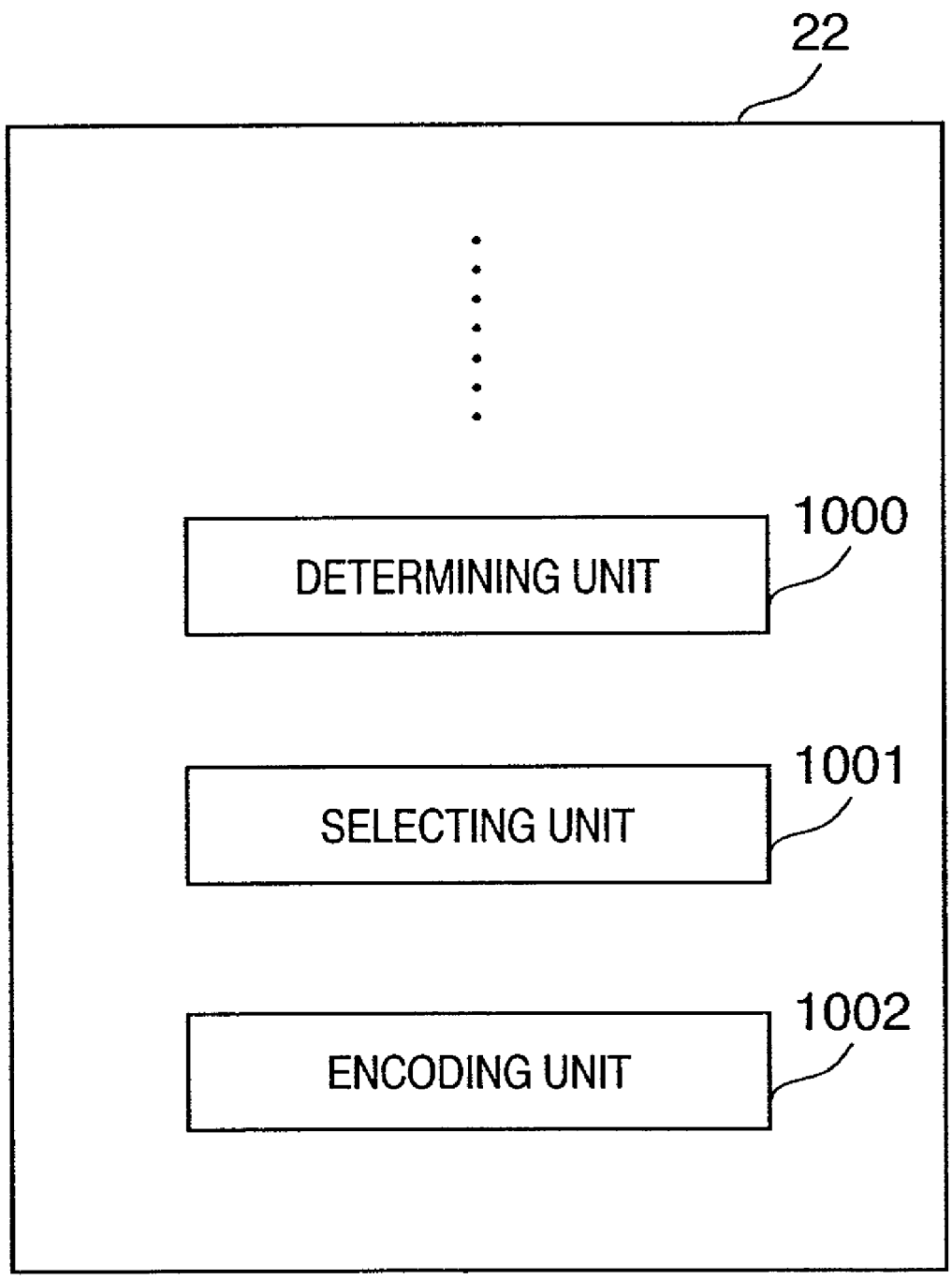

INFORMATION PROCESSING METHOD AND APPARATUS

FIELD OF THE INVENTION

This invention generally relates to an information processing apparatus, and more particularly, to a facsimile apparatus for transmitting/receiving color facsimile data.

BACKGROUND OF THE INVENTION

Currently, a color facsimile apparatus intended for general consumers has already been commercialized. However, this color facsimile apparatus intended for general consumers do not have a batch transmission function. The batch transmission function transmits separate pieces of information to the same destination by a single call, hereinafter sometimes referred to as one call origination.

Consider a case in which a company A is to transmit facsimile data to a company B. Nowadays, a facsimile apparatus is an indispensable unit for sending a copy of a document. The number of transmissions per day is very large. Once in a while, several employees in company A may simultaneously transmit facsimile data to company B. In this case, according to a conventional method, every time a facsimile original is sent, a call must be originated to the company B. That is, a series of operations, e.g., call origination, device handshaking, and disconnection, is repeated in proportion to the number of originals to be sent, thus wasting time and incurring unnecessary telephone expense.

If a plurality of originals in a send queue has the same destination in a facsimile apparatus, the above processing time can be shortened by sending these originals by one call origination. In order to do so, solving such a problem, a batch transmission function is very effective.

In such a facsimile apparatus equipped with a batch transmission function, pieces of information having the same destination are batch-transmitted by a single call regardless of the type of information involved.

Consider a case in which a batch transmission function is provided for a color facsimile apparatus. The color facsimile apparatus can transmit not only color information but also monochrome information as in the prior art. If, therefore, this batch transmission function is in effect and there are pieces of color information as well as monochrome information having the same destination, then both pieces of information are transmitted by one call connection regardless of whether they are color or monochrome data.

The facsimile apparatus on the receiving side receives pieces of information encoded by different image encoding schemes in one receiving operation. This may cause confusion in decoding processing. For example, one part of the information received in one receiving operation may be multilevel information encoded by JPEG encoding, while another part may be binary information encoded by MH encoding, MR encoding, MMR encoding, or JBIG encoding.

SUMMARY OF THE INVENTION

Accordingly, it is an object of the present invention to provide an information processing apparatus comprising an accepting unit for accepting designation of a destination associated with encoded information, a storage unit for storing information to be transmitted to the designated destination, an extractor unit for extracting pieces of information of the same type and destination from the pieces of information stored in the storage unit, and a transmitter unit for batch-transmitting the pieces of information extracted by the extractor unit.

It is another object of the present invention to provide an information processing apparatus comprising an input unit for inputting a destination of encoded information, a storage unit for storing pieces of information to be transmitted to the input destination, an extractor unit for extracting pieces of information of the same destination from the pieces of information stored in the storage unit, a generating unit for classifying the pieces of information extracted by the extractor unit according to an information type so as to generate an information group constituted by pieces of information of the same type, and a transmitter unit for transmitting the pieces of information for each of the generated information groups.

To the above-described invention, if, for example, batch transmission is selected in the color facsimile apparatus, since color transmission information and monochrome transmission information are transmitted by originating different calls, the two type of transmission information do not mix in one receiving operation, so more reliable receiving operation can be achieved.

The rest invention is particularly advantageous in that information can be transmitted with a fewer number of call originations, thus improving the transmission efficiency of information.

Other objects, features and advantages of the present invention will be apparent from the following detailed description taken in conjunction with the accompanying drawings, in which like reference characters designate the same or similar elements throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view showing an arrangement of one-touch dial data in the first embodiment;

FIG. 10 is a block diagram showing processes implemented by a CPU and software according to a third embodiment of the present invention.

DETAILED DESCRIPTION OF THE PREFERRED EMBODIMENTS

Preferred embodiments of the present invention will now be described in detail with reference to the accompanying drawings.

The following embodiments are provided to explain the present invention. It is to be understood that those skilled in the art can easily practice the present invention by referring to the following embodiments. The embodiments described below are merely parts of the technical range defined by the claims. Obviously, even embodiments that are not directly described in this specification fall within the technical scope of the present invention as long as they are based on the same technical concept. If a plurality of embodiments is described, they can be combined, as needed. In addition, a description of elements that are described in a given embodiment and common in other embodiments may be omitted with respect to description of these other embodiments.

In brief, according to this embodiment, a destination of encoded information is input, pieces of information to be transmitted to the input destination are stored, and the destination and pieces of information of the same type are extracted from the pieces of stored information, thereby batch-transmitting the extracted information.

There are various embodiments associated with extraction and call origination timing, e.g., an embodiment in which all transmission targets are extracted before call origination, and an embodiment in which after the first transmission target is extracted and a call is originated, extraction is repeated until no transmission targets having a common call destination remain. Each embodiment is based on a technical concept that pieces of information of the same destination and type are transmitted together resulting in fewer call originations.

In addition, this embodiment exemplifies the transmission of image data in a facsimile apparatus. However, information to be transmitted may be other data such as speech data, moving image data, and files. A description will now be given of an information processing apparatus according to a first embodiment of the present invention, with reference to FIG. 1.

According to first embodiment, after the first transmission target is extracted and a call is originated, extraction and transmission are repeated until no transmission target for the origination destination remains. More specifically, all pieces of monochrome information are extracted and batch-transmitted first, after which then the remaining pieces of color information are batch-transmitted. Obviously, the order in which monochrome information and color information are transmitted may be reversed.

Figure 1:
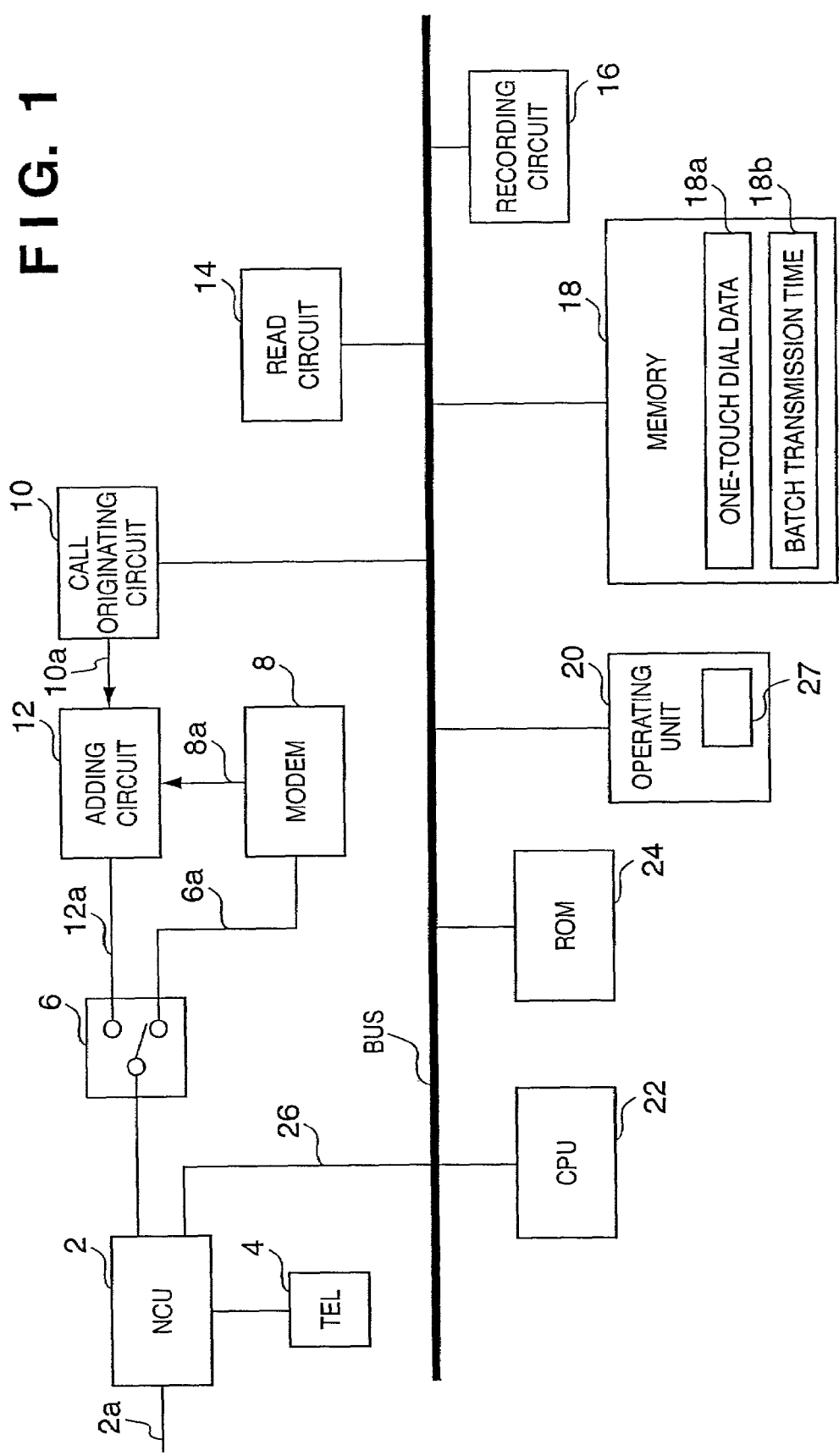
FIG. 1 is a block diagram showing an arrangement of a color facsimile apparatus according to a first embodiment of the present invention.

FIG. 1 is a block diagram showing a facsimile apparatus according to a first embodiment of the present invention. A network control unit (hereinafter referred to as an NCU) 2 switches a connection destination of a telephone network from the telephone to the facsimile apparatus or performs connection control on the telephone network, thereby holding a loop. The NCU 2 turns a CML ON/OFF via a bus 26. In this case, "CML OFF" indicates that a telephone line 2a is connected to a telephone side, and "CML ON" indicates that the telephone line 2a is connected to a facsimile apparatus side. Note that the telephone line 2a in a normal state is connected to a telephone 4.

A hybrid circuit 6 separates a transmission-system signal and a reception-system signal from each other. In the transmission system, a transmission signal from an adding circuit 12 is output to the telephone line 2a through the NCU 2. In the reception system, a signal from the other party is received through the NCU 2 and sent to a modem 8 through a signal line 6a. Signal processing units in the transmission and reception systems can also be referred to as a transmission unit and reception unit, respectively.

The modem 8 performs modulation and demodulation based on V. 8, V. 21, V. 27 ter, V. 29, V. 17, or V. 34 recommended by ITU-T. Each transmission mode of the modem 8 is controlled by the CPU through the bus 26. The modulating unit of the modem 8 receives a transmission signal from the bus 26, modulates it, and outputs the modulated data to a signal line 8a. The demodulating unit of the modem 8 receives a reception signal through the signal line 6a, demodulates it, and outputs the demodulated data to the bus 26.

A call originating circuit 10 receives telephone number information through the bus 26 and outputs a DTMF selection signal to a signal line 10a. The adding circuit 12 receives information through the signal line 8a and information through the signal line 10a and outputs a sum of the two signals to a signal line 12a.

A read circuit 14 can read color information and outputs the read data to the bus 26. A recording circuit 16 can record color information and sequentially records information output to the bus 26 line by line.

A memory 18 is a storage unit for storing data. For example, this memory is used as a work memory (RAM) or for storing various data through the bus 26. For example, the various data include raw information of read data, encoded information, received information, and decoded information. As can be appreciated, although this unit will be described as a memory, the unit may be other storage units such as a magnetic disk unit.

One-touch dial data is stored in the memory 18. FIG. 2 shows an example of one-touch dial data. The one-touch dial data includes data such as one-touch dial numbers, destinations (e.g., telephone numbers), and information indicating whether to perform batch transmission or not.

An operating unit 20 is a so-called key input unit, and outputs information about a key pressed by a user to the bus 26. Examples of the operation keys are: a one-touch dial, abbreviated dial, ten keys, * key, # key, start key, stop key, set key, registration key for the memory 18, color transmission selection key, and other function keys. Note that the operating unit 20 may have a display unit 27. The display unit 27 receives the information output to the bus 26 and displays its contents. Note that the operating unit 20 may be an input unit for inputting a user's request to the facsimile apparatus.

A central processing unit 22 (hereinafter referred to as a CPU) controls the overall facsimile apparatus and executes a facsimile transmission control procedure. Note that a control program for this procedure is stored in a ROM 24. The CPU 22 implements various functions by executing software such as the control programs. For example, the CPU 22 activates an extractor unit for extracting information having a common transmission destination by type and encoding method from the information stored in the memory 18.

The ROM 24 stores a program for transmitting pieces of transmission information by one call connection, a program for selecting a color information read mode, a program for transmitting color information and monochrome information by different call connections when transmission of pieces of information to the same destination is selected, and the like.

Note that the bus 26 is a generic name for a data bus for transmitting a data signal such as image data and a control bus for transmitting a control signal from the CPU 22. This manner of description is aimed at a simple illustration. In practice, however, these buses may be provided separately.

Processing in this first embodiment having the above described arrangement will be described below.

Figure 3:
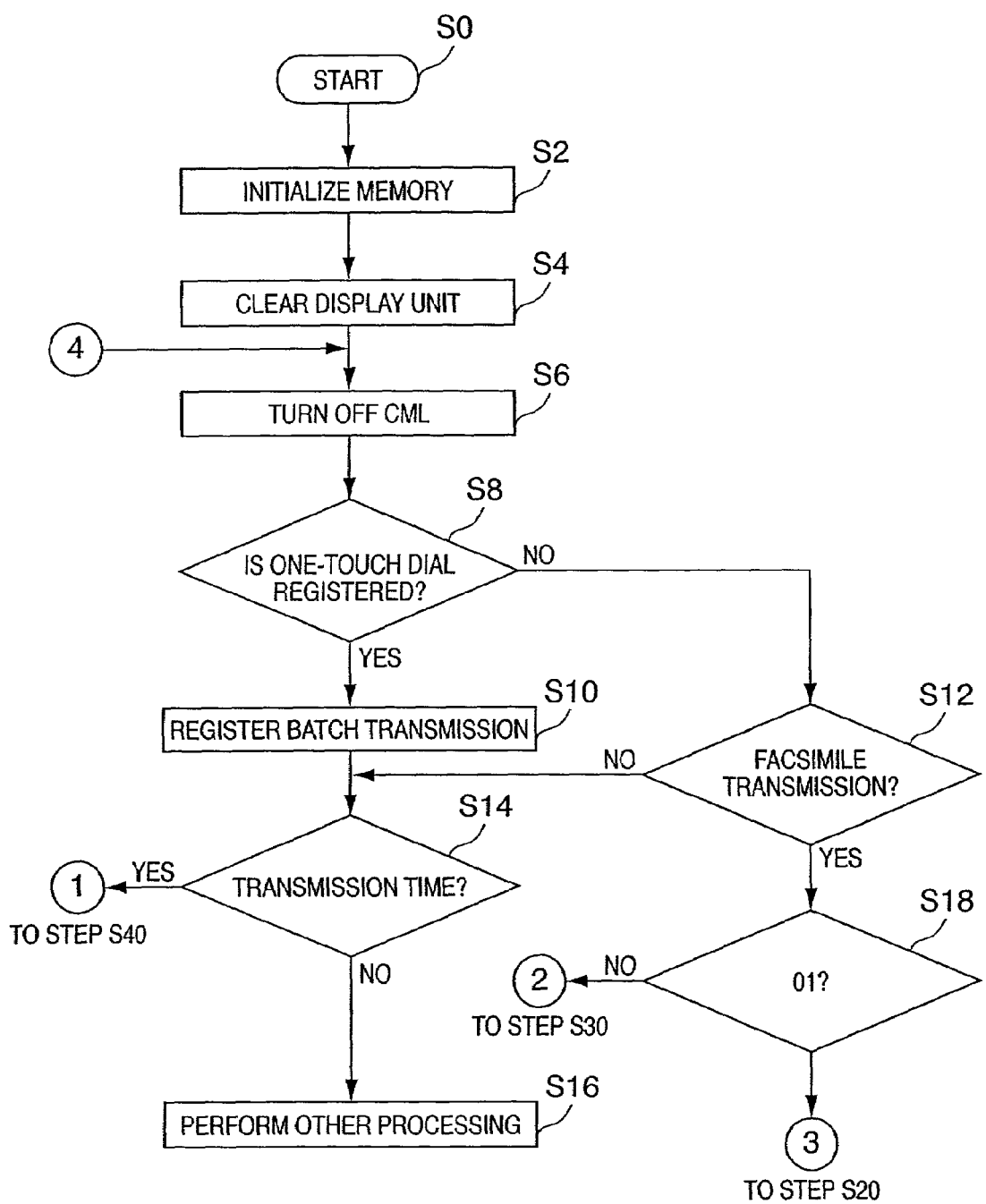
FIGS. 3, 4, 5, 6, and 7 are flow charts of operations performed in the first embodiment.
Figure 4:
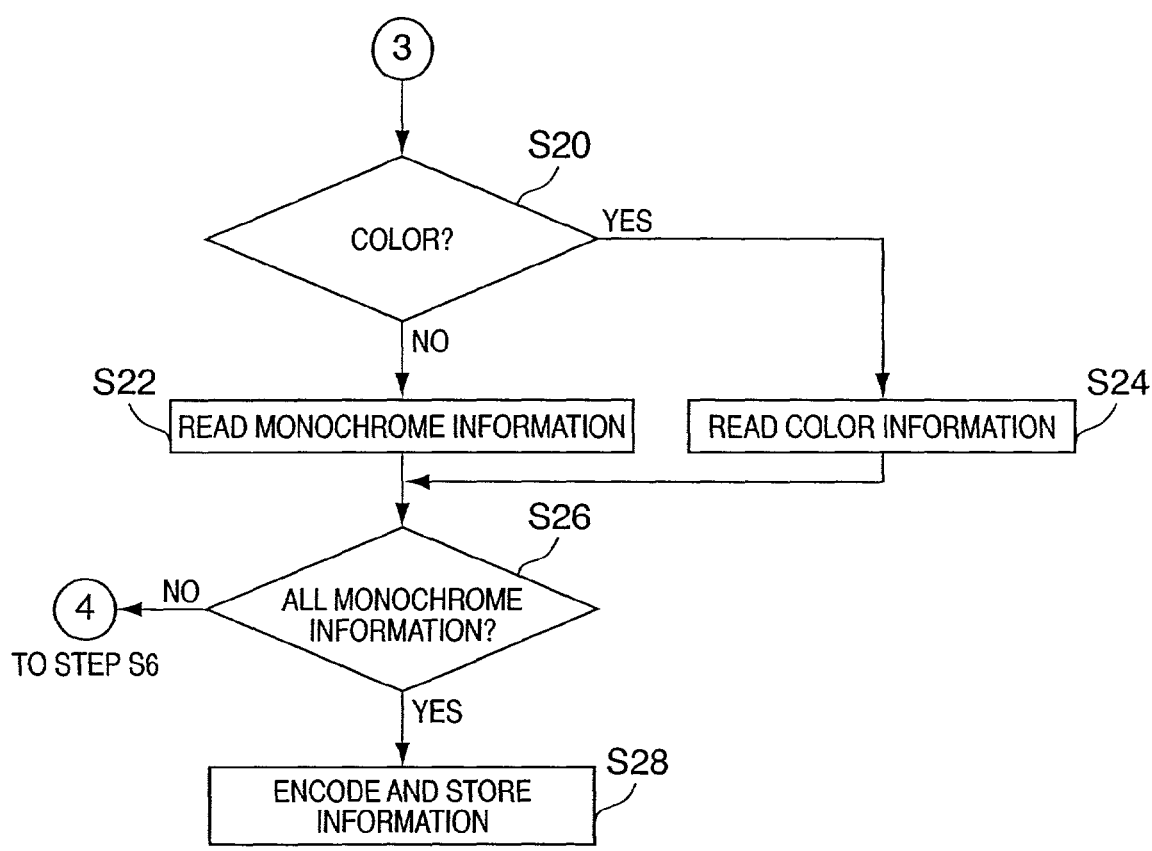
Figure 5:
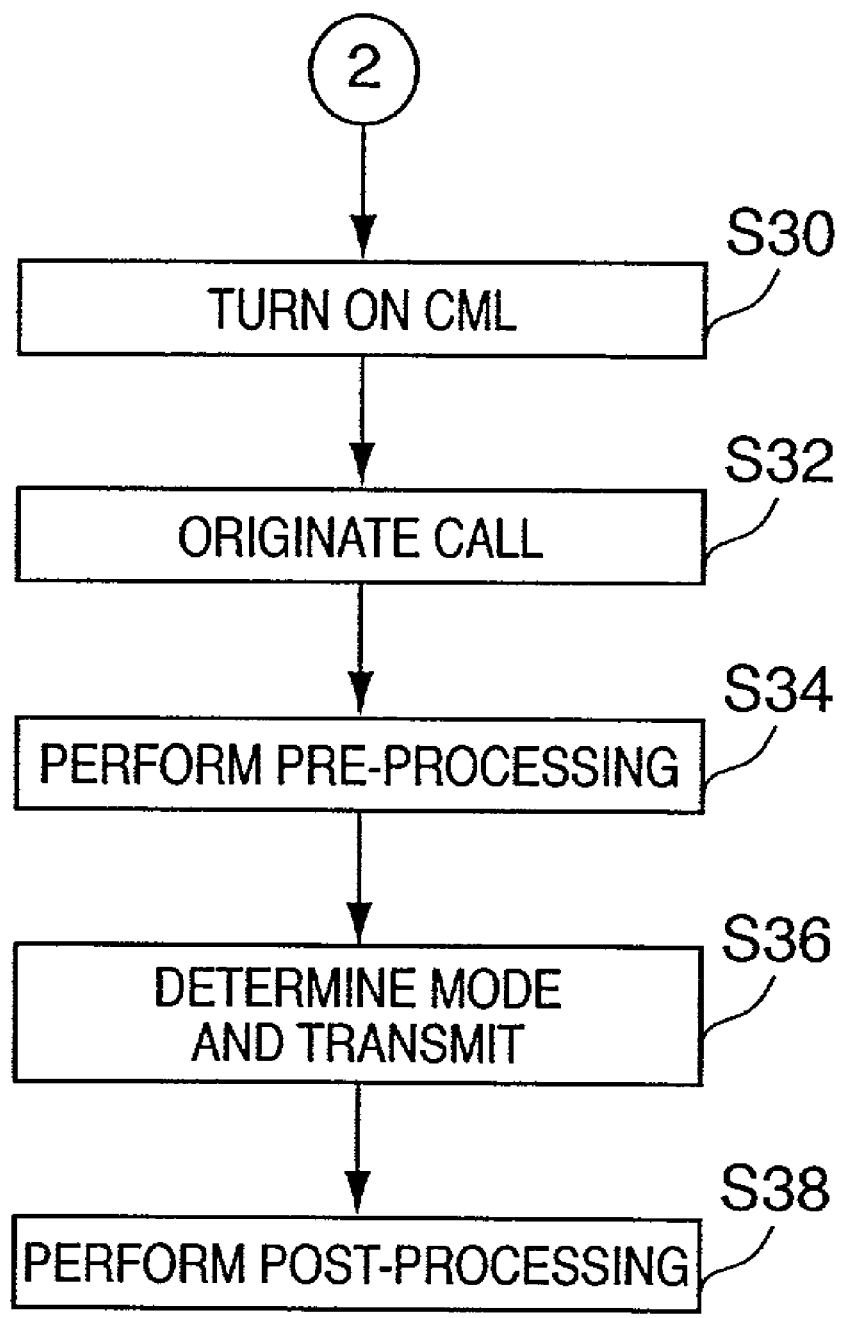
Figure 6:
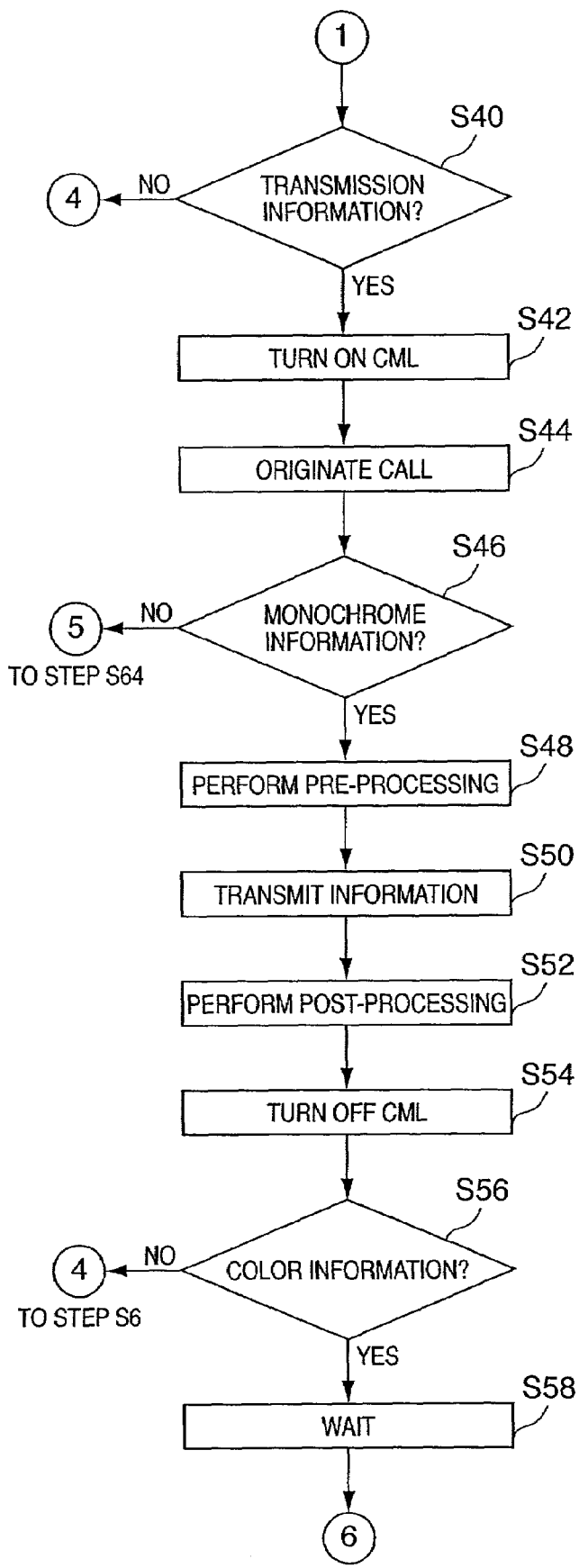
Figure 7:
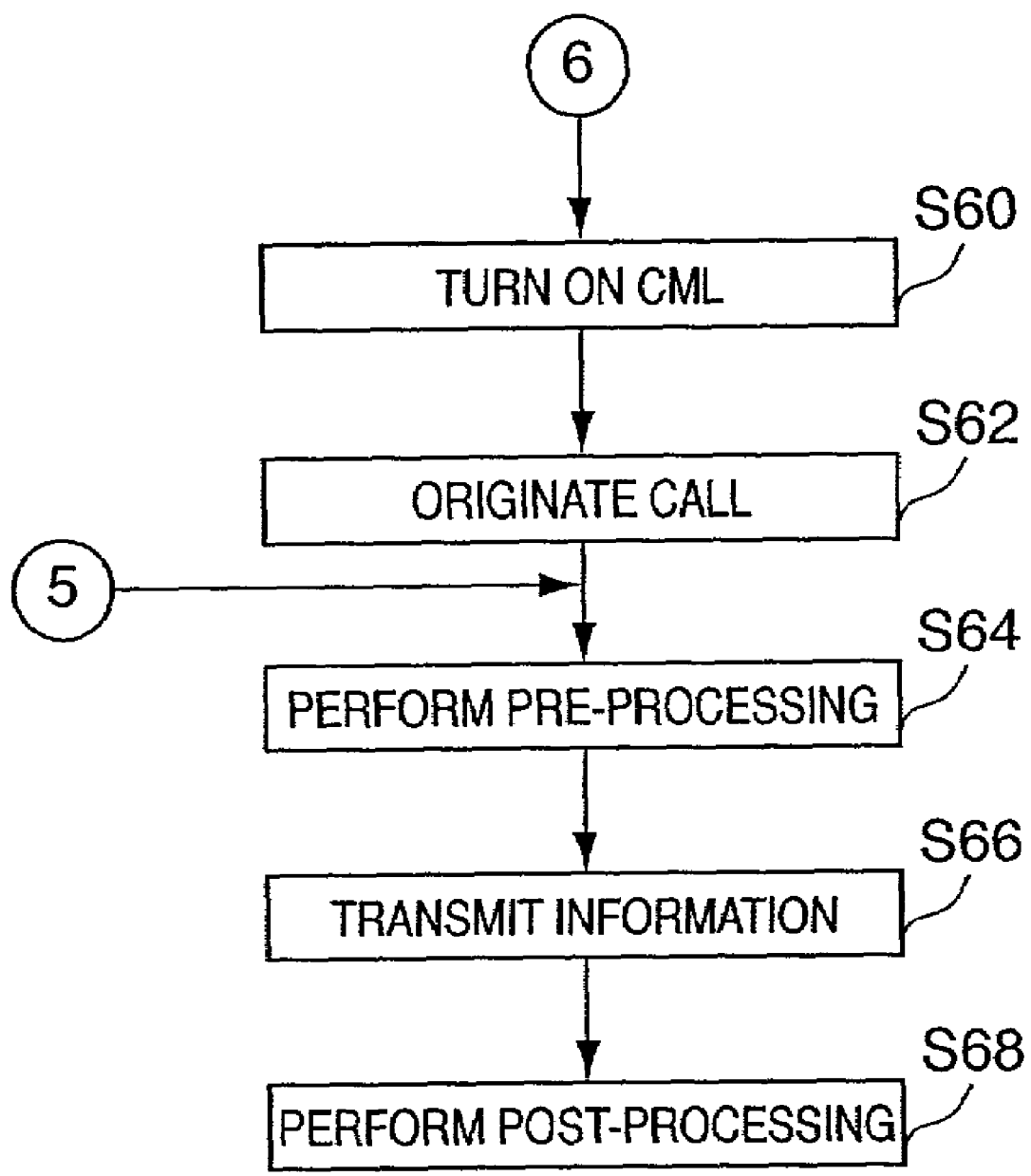

FIGS. 3 to 7 are flow charts in the arrangement shown in FIG. 1. Referring to FIG. 3, in a step S0, the processing starts. In a step S2, the CPU 22 initializes the memory 18 through the bus 26. Note that in the following operations as well, the CPU 22 generally transmits control signals to respective components through the bus 26. In a step S4, the CPU 22 clears the display unit 27. In a step S6, the CPU 22 turns OFF the CML. In a step S8, the CPU 22 checks whether registration of a one-touch dial is selected. If YES In a step S6, the flow advances to a step S10. If NO In a step S6, the flow advances to a step S12. In a step S10, the CPU 22 registers one-touch dial data in the memory 18. More specifically, if "01" is selected as a specific one-touch dial, "03-1234-0XXX" is registered as the destination of one-touch dial 01, with "YES" for batch transmission being set. In a step S12, the CPU 22 checks whether facsimile transmission is selected through the operating unit 20. If YES In a step S12, the flow advances to a step S18. If NO In a step S12, the flow advances to a step S14. In a step S14, the CPU 22 reads out a batch transmission time 18b from the memory 18 and compares it with the current time. For example, the CPU 22 checks whether 9 p.m. has come. If YES In a step S14, the flow advances to a step S40. If NO In a step S14, the flow advances to a step S16 to perform other processing. Note that the time of batch transmission may be designated every time an original is read or at the time of one-touch dial registration. This batch transmission time is also stored in the memory 18. In a step S18, the CPU 22 checks whether the one-touch dial designated through the operating unit 20 is "01". If YES In a step S18, the flow advances to a step S20. If NO In a step S18, e.g., if one-touch dial "02" is designated, the flow advances to a step S30.

In a step S20, the CPU 22 checks whether color transmission is selected through the operating unit 20. If YES In a step S20, the flow advances to a step S24. If NO In a step S20, the flow advances to a step S22. In a step S22, the read circuit 14 reads monochrome information in the page order. The CPU 22 binary-encodes (e.g., JBIG-encodes) the read monochrome information and stores the resultant information in the memory 18. In a step S24, the read circuit 14 reads color information in the page order. The CPU 22 multilevel-encodes (e.g., JPEG-encodes) this color information and stores the resultant information in the memory 18.

Note that In a step S26, the CPU 22 checks whether all the information read by the read circuit 14 is monochrome information. This step is performed because the user may erroneously designate a read of color information in spite of monochrome information. If YES In a step S26, the flow advances to a step S28 to binary-encode the read information and store the resultant information in the memory 18. If NO In a step S26, the flow advances to a step S6.

In a step S30, the CPU 22 turns on the CML of the NCU 2. In a step S32, the CPU 22 originates a call to the designated destination by using the read circuit 14. In a step S34, pre-processing is performed. In a step S36, the CPU 22 determines a communication mode from the selected transmission mode and reception capability, and transmits an image signal. In a step S38, post-processing is performed.

In a step S40, the CPU 22 checks whether transmission information is present. If YES In a step S40, the flow advances to a step S42. If NO In a step S40, the flow advances to a step S6. In a step S42, the CPU 22 turns on the CML of the NCU 2. In a step S44, the CPU 22 originates a call to "03-1234-0XXX" by using the call originating circuit 10. In a step S46, the CPU 22 checks whether the information is monochrome information. If YES In a step S46, the flow advances to a step S48. If NO In a step S46, the flow advances to a step S64. This decision step can be regarded as the process of extracting pieces of information of the same image type or encoding method. In a step S48, pre-processing is performed. In this step, monochrome transmission is designated. In a step S50, the CPU 22 reads out pieces of binary-encoded information with a common transmission destination from the memory 18 and sequentially transmits them. In other words, the CPU 22 extracts images with a common transmission destination from the plurality of images stored in the memory 18 and transmits the extracted images. In a step S52, post-processing is performed. In a step S54, the CPU 22 turns off the CML of the NCU 2. With this operation, the pieces of binary-encoded information with the same designated destination can be transmitted by one call origination.

In a step S56, the CPU 22 checks whether color information is present. If YES In a step S56, the flow advances to a step S58. If NO In a step S56, the flow advances to a step S6. This decision step can be regarded as the processing of extracting pieces of information of the same image type or encoding method. In a step S58, the CPU 22 waits for 30 seconds. In a step S60, the CPU 22 turns on the CML of the NCU 2. In a step S62, the CPU 22 originates a call to "03-1234-0XXX" by using the read circuit 14. In a step S64, pre-processing is performed. In this step, color transmission is designated. In a step S66, the CPU 22 reads out pieces of multilevel-encoded information with a common destination designated from the memory 18 and sequentially transmits them. In a step S68, post-processing is performed.

A description will now be given of an information processing apparatus according to a second embodiment of the present invention, with reference to FIGS. 8 an 9.

According to the second embodiment, pieces of information of the same origination destination and type are extracted before call origination, using same apparatus arrangement as that shown in FIG. 1.

Figure 8:
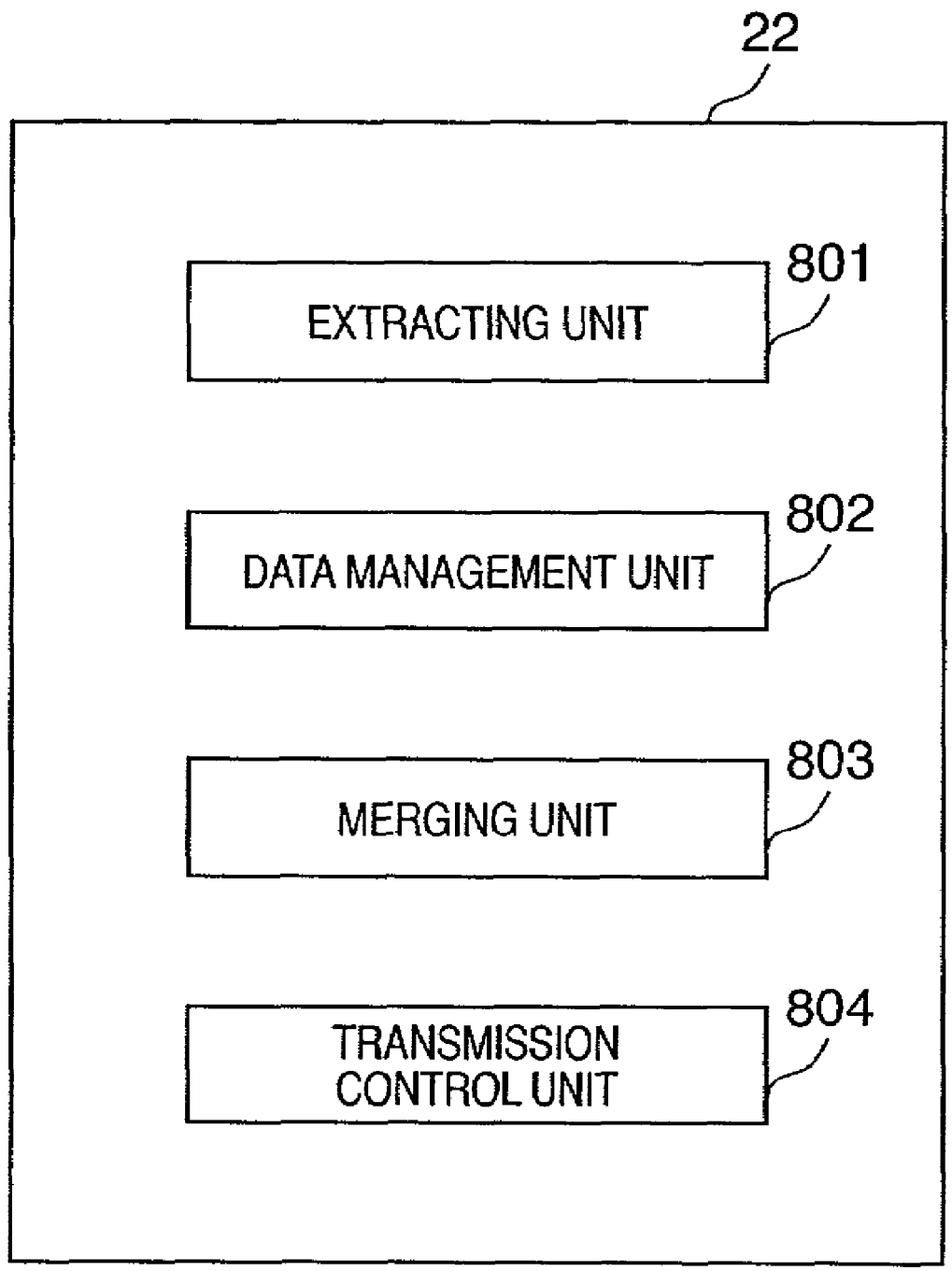
FIG. 8 is a block diagram showing processes implemented by a CPU and software according to a second embodiment of the present invention.
Figures 9A, 9B:
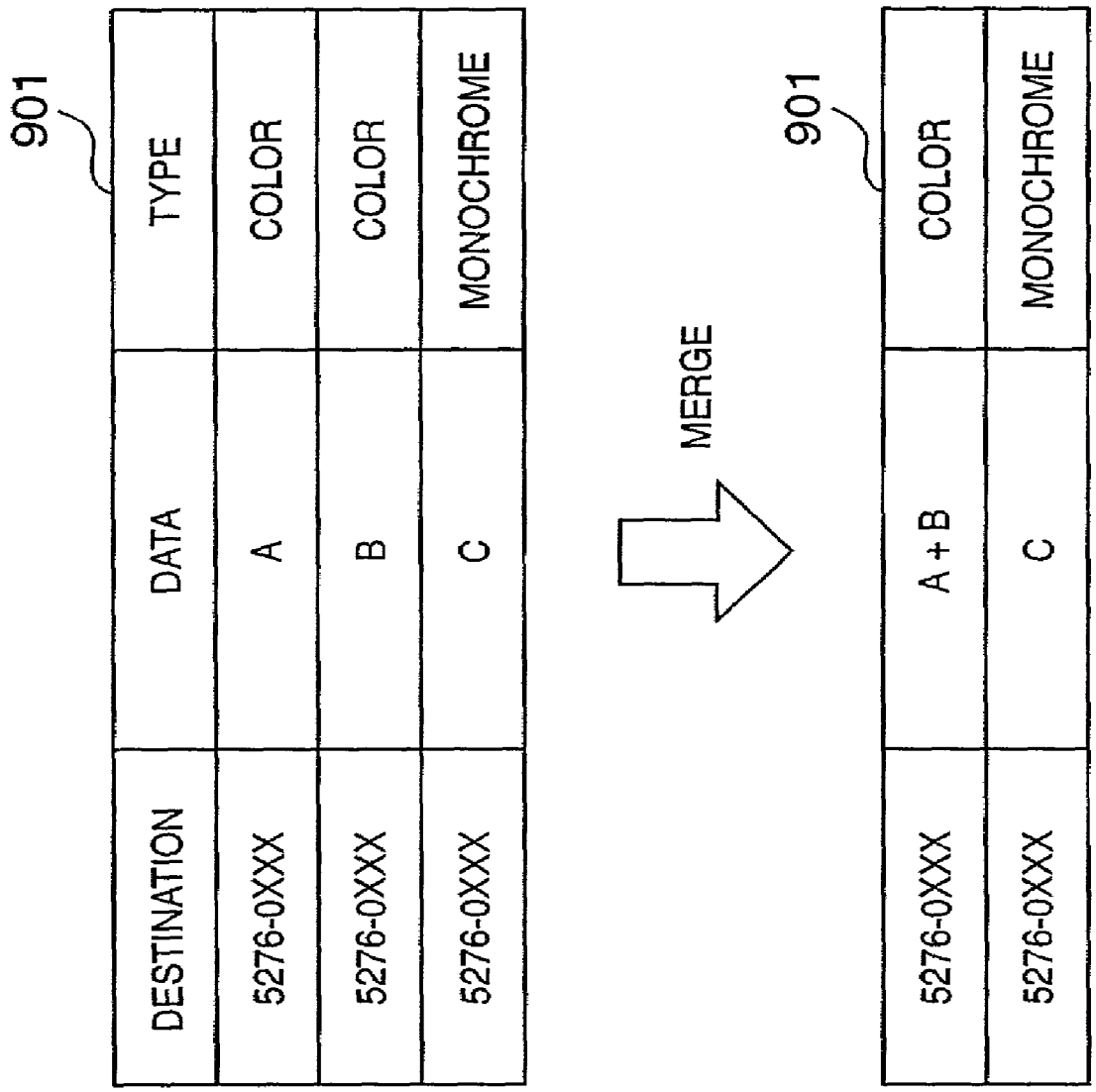
FIGS. 9A and 9B are views showing an arrangement of a transmission list in the second embodiment.

FIG. 8 shows various functions that are implemented by a CPU 22 in combination with software. An extractor unit 801 extracts pieces of information to be transmitted by one call origination. Note that the number of call originations is not limited to one, and may be arbitrarily set as long as it is fewer than the number of originals to be transmitted. A data management unit 802 manages the transmission list shown in FIG. 9. More specifically, upon reception of a request to transmit a new original from a user, the data management unit 802 adds a new transmission entry to the transmission list. Note that upon reception of a request to complete transmission or a request to delete from the user, the data management unit 802 deletes the corresponding entry. A merging unit 803 merges pieces of extracted information into smaller units of information. To transmit pieces of information by one call origination, the pieces of information are inevitably merged into one piece of information. Note that "merge" unit not only the processing of merging a plurality of files on which information is recorded into one file but also the process of handling a plurality of files as one transmission target in terms of transmission management. A transmission control unit 804 controls a call originating circuit 10 and the like required for transmission on the basis of a transmission list 901.

A series of operations performed by/with/in above described second embodiment will be described below. When a facsimile data transmission request is input through an operating unit 20, a transmission original is read by a read circuit 14, and the image data of the original is stored in a memory 18 serving as a storage unit. The user inputs a transmission destination for the original by using the operating unit 20 serving as a kind of input unit. Assume that three originals are in a standby state for transmission. A transmission list in this state is indicated by "(a)" in FIG. 9. The data management unit 802 creates the transmission list 901 containing at least identifiers for identifying the read originals and the information about the input destination.

Note that the data management unit 802 adds a transmission destination and the identifier of information to be transmitted to the transmission list 901 every time facsimile transmission is designated. In the transmission list 901 created in this manner, three transmission entries are present, and the transmission destination of each entry is "5276-0XXX". The transmission originals are termed as A, B, and C in descending order. The originals A and B are color images, and the original C is a monochrome image. Setting of a color image or monochrome image is done by using the same technique as described above.

The extractor unit 801 extracts pieces of information of the same transmission destination and the same type or encoding method by checking the transmission list 901. In the case shown in FIG. 9, since the three entries have a common transmission destination, "5276-0XXX", the extractor unit 801 extracts the originals A, B, and C. The extractor unit 801 then extracts the originals A and B, both of which are color images, as pieces of information of the same type. The merging unit 803 merges the originals A and B extracted by the extractor unit into a single information unit. If, for example, the extractor unit 801 extracts the 3-page color original A and 4-page color original B with the common destination from the transmission list 901, the merging unit 803 adds the original B to the end of the original A to create a 7-page original A+B. Note that the second extraction process of extracting the originals A and B can be regarded as information classification processing from another point of view. That is, it can also be said that original images are classified according to the types of images and encoding. In addition, extraction processing and classification processing can be regarded as a grouping process. That is, originals (image data) are grouped on the basis of destination and also sub-grouped on the basis of types of images or the like. The data management unit 802 deletes the entries of the originals A and B from the transmission list 901 and creates a new entry for the original A+B. Obviously, the destination set for the original A+B is the same as that for the originals A and B. The transmission control unit 804 controls the call originating circuit 10 and the like so as to transmit the original A+B on the basis of the transmission list 901 updated in this manner.

With this processing, originals can be transmitted by a smaller number of call originations. If transmission can be done by a smaller number of call originations, the processing delay due to handshaking upon call origination can be reduced. In addition, since data are transmitted after they are classified and merged according to the types of images and encoding, confusion on the receiving side can be reduced.

A description will now be given of an information processing apparatus according to a third embodiment of the present invention, with reference to FIG. 10.

In this embodiment, even if a 1-page color document partly contains monochrome information, the document is JPEG-encoded and transmitted.

In addition, even if a color document constituted by a plurality of pages contains a page consisting of monochrome information alone, the document is JPEG-encoded and transmitted.

Even if, however, a color information read is selected at the time of a document read, though all the information is monochrome information, the document is processed as monochrome information.

FIG. 10 shows various types of component that are implemented by a CPU 22 in combination with software. A determining unit 1000 checks whether a sequence of image data read by a read circuit 14 is image data having a predetermined relationship. This determination is executed even if a read of color image is designated by the user, because the user may erroneously select a color image in spite of a monochrome original. A selecting unit 1001 selects a proper encoding method on the basis of the determination made by the determining unit 1000. An encoding unit 1002 then encodes the image data read by the read circuit 14 by the encoding method selected by the selection unit. A program for encoding processing is stored in a ROM 24.

Note that image data having a predetermined relationship are image data of the same type. For example, when read image data are all monochrome data, they have a predetermined relationship. In this case, the selecting unit 1001 selects a binary encoding method. The encoding unit 1002 encodes a sequence of image data by the binary encoding method. Whether given image data is monochrome data or not can be determined by analyzing the color of the read image.

If the determining unit 1000 determines that not all the sequence of image data is monochrome image data, the selecting unit 1001 selects a multilevel encoding method. The encoding unit 1002 encodes the sequence of image data by the selected multilevel encoding method. Note that examples of the case where not all a sequence of image data are image data are: a case where a 1-page color document partially contains monochrome information, and a case where a color document constituted by a plurality of pages contains a page consisting of monochrome information alone.

As binary encoding methods, for example, MH encoding, MR encoding, MMR encoding and JBIG encoding are available. As can be appreciated by those of skill in the art, however, other binary encoding methods may be used. As multilevel encoding methods, JPEG encoding and the like are available. As can be appreciated by those of skill in the art, however, other multilevel encoding methods may be used.

With the above operation, even if one document contains both color and monochrome image data, an original image can be transmitted to the other party with higher fidelity. In addition, in transmitting one document, a mixture of a plurality encoding methods can be prevented, thus preventing confusion on the receiving side. Furthermore, even if the user erroneously designates a read of color images in spite of the fact that the images to be read are all monochrome images, the images can be properly encoded in the monochrome mode.

Additional embodiments are also conceivable. Thus, the present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is also achieved by supplying a storage medium storing software program codes for achieving the effects of the above-described embodiments to a system or apparatus, and causing the computer (or a CPU or an MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the OS (Operating System)

running on the computer performs part or all of the actual processing on the basis of the instructions of the program codes.

The functions of the above-described embodiments are also realized when the program codes read out from the storage medium are written in the memory of a function expansion card inserted into the computer or a function expansion unit connected to the computer, and the CPU of the function expansion board or function expansion unit performs part or all of actual processing on the basis of the instructions of the program codes.

When the present invention is to be applied to the above storage medium, program codes corresponding to at least one or a plurality of flow charts shown in FIG. 3 to 7 described above are stored in the storage medium.

According to the present invention, in a color facsimile apparatus, when batch transmission is selected, color transmission information and monochrome transmission information are transmitted by originating different calls. This prevents the monochrome information and color information from being simultaneously received by one receiving operation. This makes it possible to perform receiving operation with higher reliability. In addition, since information can be transmitted by a smaller number of call originations, the information transmission efficiency improves.

As many apparently widely different embodiments and variations of the present invention can be made without departing from the spirit and scope thereof, it is to be understood that the invention is not limited to the specific embodiments thereof except as defined in the appended claims.

What is claimed is:

1. An information processing apparatus comprising:
   an accepting unit that accepts designation of a destination to be associated with encoded information;
   an extracting unit that extracts information having an identical destination and type from the information stored in said storage unit; and
   a transmitter which batch-transmits the pieces of information extracted by said extracting unit,
   wherein said transmitter disconnects a line between batch-transmitting one of a monochrome image and a color image and batch-transmitting the other of the monochrome image and the color image to the identical destination so that said transmitter respectively batch-transmits the monochrome image and the color image via different calls.

2. The apparatus according to claim 1, further comprising a merging unit that merges the pieces of information extracted by said extracting unit into a smaller number of pieces of information, wherein said transmitter transmits the information merged by said merging unit to designated destination.

3. The apparatus according to claim 1, wherein said transmitter transmits the extracted information by originating calls fewer in number than the pieces of extracted information.

4. The apparatus according to claim 1, wherein said transmitter transmits the extracted information by originating a single call.

5. The apparatus according to claim 1, wherein said extracting unit further comprises:
   a first extracting component that extracts pieces of information having an identical of destination from information stored in said storage unit; and
   a second extracting component that extracts pieces of information of identical type from the pieces of information extracted by said first extracting component.

6. The apparatus according to claim 1, wherein the information processing apparatus is a color facsimile apparatus, and the information is image data.

7. The apparatus according to claim 6, further comprising:
   a reader unit that reads image data; and
   an encoder unit that encodes by a predetermined encoding method the image data read by said reader unit,
   wherein said extracting unit extracts encoded image data as the information.

8. The apparatus according to claim 7, further comprising a determining unit that determines whether a plurality of image data read by said reader unit have a predetermined relationship to each other, wherein said encoder performs encoding by selecting an encoding method based on a determination made by said determining unit.

9. The apparatus according to claim 8, wherein the predetermined relationship is a relationship that is established when the plurality of image data are of the same type.

10. The apparatus according to claim 9, wherein:
    said determining unit determines that the plurality of data have the predetermined relationship whenever all the plurality of image data is monochrome image data; and
    said encoder unit encodes the plurality of monochrome image data by using a binary encoding method.

11. The apparatus according to claim 10, wherein the binary encoding method is MH encoding.

12. The apparatus according to claim 10, wherein the binary encoding method is MR encoding.

13. The apparatus according to claim 10, wherein the binary encoding method is MMR encoding.

14. The apparatus according to claim 10, wherein the binary encoding method is JBIG encoding.

15. The apparatus according to claim 9, wherein:
    said determining unit determines that the plurality of data do not have the predetermined relationship whenever not all the plurality of image data is monochrome image data, and
    said encoder encodes the plurality of image data by a multilevel encoding method.

16. The apparatus according to claim 15, wherein the multilevel encoding method is JPEG encoding.

17. An information processing apparatus comprising:
    an input unit that inputs a destination for encoded information;
    a storage unit that stores pieces of information to be transmitted to the input destination;
    an extracting unit that extracts information identical destination and encoding method from the information stored in said storage; and
    a transmitter that transmits the information extracted by said extracting unit,
    wherein said transmitter disconnects a line between transmitting one of a monochrome image and a color image and batch-transmitting the other of the monochrome image and the color image to the identical destination so that said transmitter respectively transmits the monochrome image and the color image via different calls.

18. The apparatus according to claim 17, further comprising a merging unit that merges the pieces of information extracted by said extracting unit into a smaller number of pieces of information, wherein said transmitter transmits information merged by said merging unit to the destination.

19. The apparatus according to claim 17, wherein said transmitter transmits the extracted information by call originating calls fewer in number than the extracted information.

20. An information processing apparatus comprising:
an input unit that inputs a destination to be associated with encoded information;
a storage unit that stores pieces of information to be transmitted to the input destination;
an extracting unit that extracts pieces of information which are common in terms of destination from the pieces of information stored in said storage unit;
a classifying unit that classifies the information extracted by said extracting unit according to information type;
a generator unit that generates an information group constituted by information of the same type; and
a transmitter that transmits the information for each of generated information groups,
wherein said transmitter disconnects a line between transmitting one of a monochrome image and a color image and batch-transmitting the other of the monochrome image and the color image to the identical destination so that said transmitter respectively transmits the monochrome image and the color image via different calls.

21. The apparatus according to claim 20, wherein said transmitter transmits the extracted information by call originations fewer in number than the pieces of information.

22. The apparatus according to claim 21, wherein said transmitter transmits the pieces of extracted information by originating a single call.

23. An information processing method comprising the steps of:
accepting designation of a destination associated with encoded information;
storing information to be transmitted to the accepted destination;
extracting pieces of information of identical destination and type from information stored in the information storing step;
batch-transmitting the pieces of extracted; and
disconnecting a line between batch-transmitting one of a monochrome image and a color image and batch-transmitting the other of the monochrome image and the color image to the identical destination so that the monochrome image and the color image are respectively batch-transmitted via different calls.

24. The method according to claim 23, further comprising the step of merging the pieces of extracted information into a smaller number of pieces of information, wherein, in the batch-transmitting step, the merged information is transmitted to the destination.

25. The method according to claim 23, wherein in the batch-transmitting step, the extracted information is transmitted by call originations fewer in number than the pieces of extracted information.

26. The method according to claim 25, wherein in the batch-transmitting step, the extracted information is transmitted by originating a single call.

27. The method according to claim 23, wherein the extracting step comprises:
a first extracting step of extracting information of identical destination from information stored in the storing step; and
a second extracting step of information of identical type from information extracted in the first extracting step.

28. The method according to claim 23, wherein the information processing method is performed by a color facsimile apparatus, and the information is image data.

29. The method according to claim 28, comprising the steps of:
reading image data; and
encoding the read image data by a predetermined encoding method,
wherein, in the extracting step, the information extracted is encoded image data.

30. The method according to claim 29, further comprising the step of determining whether a plurality of image data read in the read step have a predetermined relationship to each other, wherein, in the encoding step, encoding is performed by selecting an encoding method based on the determination made in the determining step.

31. The method according to claim 30, wherein the predetermined relationship is a relationship that is established when the plurality of image data is of the same type.

32. The method according to claim 31, wherein:
in the determining step, it is determined that the plurality of data have the predetermined relationship whenever all the plurality of image data are monochrome image data; and
in the encoding step, the plurality of monochrome image data is encoded by using a binary encoding method.

33. The method according to claim 32, wherein the binary encoding method is MH encoding.

34. The method according to claim 32, wherein the binary encoding method is MR encoding.

35. The method according to claim 32, wherein the binary encoding method is MMR encoding.

36. The method according to claim 32, wherein the binary encoding method is JBIG encoding.

37. The method according to claim 31, wherein:
in the determining step, it is determined that the plurality of data do not have the predetermined relationship whenever not all the plurality of image data are monochrome image data, and
in the encoding step, the plurality of image data are encoded by a multilevel encoding method.

38. The method according to claim 37, wherein the multilevel encoding method is JPEG encoding.

39. An information processing method comprising the steps of:
inputting a destination for encoded information;
storing pieces of information to be transmitted to the input destination;
extracting pieces of information of identical destination and encoding method from stored information;
transmitting the extracted information; and
disconnecting a line between transmitting one of a monochrome image and a color image and batch-transmitting the other of the monochrome image and the color image to the identical destination so that the monochrome image and the color image are respectively transmitted via different calls.

40. The method according to claim 39, further comprising the step of merging the pieces of extracted information into a smaller number of pieces of information, wherein, in the transmitting step, the information is transmitted to the destination.

41. The method according to claim 39, wherein in the transmitting step the extracted information is transmitted by call originations fewer in number than the extracted information.

42. An information processing method comprising the steps of:

inputting a destination for encoded information;

storing the information to be transmitted to the input destination;

extracting pieces of information of identical destination from stored information;

classifying the pieces of extracted information according to an information type so as to generate an information group constituted by pieces of information of the same type;

transmitting the pieces of information for each generated information group; and disconnecting a line between transmitting one of a monochrome image and a color image and batch-transmitting the other of the monochrome image and the color image to the identical destination so that the monochrome image and the color image are respectively transmitted via different calls.

43. The method according to claim 42, wherein in the transmitting step, the pieces of extracted information are transmitted by call originations fewer in number than the pieces of information.

44. The method according to claim 43, wherein in the transmitting step the pieces of extracted information are transmitted by originating a single call.

45. A computer program product having a computer-readable storage medium storing a computer program which can be executed on a computer, the computer program product having a computer-readable storage medium including:

inputting a destination of encoded information;

storing information to be transmitted to the input destination;

extracting pieces of information of identical destination and type from the information stored in the storage step;

batch-transmitting the extracted information; and disconnecting a line between batch transmitting one of a monochrome image and a color image and batch-transmitting the other of the monochrome image and the color image to the identical destination so that the monochrome image and the color image are respectively batch-transmitted via different calls.

46. A computer program product having a computer-readable storage medium storing a computer program which can be executed on a computer, the computer program product having a computer-readable storage medium including:

inputting a destination for encoded information;

storing the information to be transmitted to the input destination;

extracting information of identical destination from stored information;

classifying the extracted information according to an information type so as to generate an information group constituted by information of the same type;

transmitting the information for each of generated information groups; and disconnecting a line between transmitting one of a monochrome image and a color image and batch-transmitting the other of the monochrome image and the color image to the identical destination so that the monochrome image and the color image are respectively transmitted via different calls.

* * * * *

UNITED STATES PATENT AND TRADEMARK OFFICE
CERTIFICATE OF CORRECTION

PATENT NO. : 7,095,521 B2
APPLICATION NO. : 10/043125
DATED : August 22, 2006
INVENTOR(S) : Takehiro Yoshida It is certified that error appears in the above-identified patent and that said Letters Patent is hereby corrected as shown below:

COLUMN 5:
Line 38, "In" should read -- in --.

COLUMN 6:
Line 26, "an" should read -- and --;
Line 48, "not only the processing of" should read -- not only processes the process of --.

COLUMN 8:
Line 42, "plurality" should read -- plurality of --.

COLUMN 9:
Line 53, "to" should read -- to the --; and
Line 66, "identical of" should read -- identical --.

COLUMN 10:
Line 50, "information identical" should read -- information having an identical --.

COLUMN 11:
Line 2, delete "call";
Line 3, "the" should read -- the pieces of --;
Line 41, "extracted;" should read --extracted information; --; and
Line 66, "of" (first occurrence) should read -- of extracting --.

COLUMN 12:
Line 62, "the" (first occurrence) should read -- the merged --; and
Line 66, "the" should read -- the pieces of --.

UNITED STATES PATENT AND TRADEMARK OFFICE
CERTIFICATE OF CORRECTION

PATENT NO. : 7,095,521 B2
APPLICATION NO. : 10/043125
DATED : August 22, 2006
INVENTOR(S) : Takehiro Yoshida It is certified that error appears in the above-identified patent and that said Letters Patent is hereby corrected as shown below:

<u>COLUMN 14</u>:
Line 5, "batch transmitting" should read -- batch-transmitting --.

Signed and Sealed this

First Day of May, 2007

JON W. DUDAS
*Director of the United States Patent and Trademark Office*